United States Patent
Notoshi et al.

(10) Patent No.: US 10,690,956 B2
(45) Date of Patent: Jun. 23, 2020

(54) LIQUID CRYSTAL DISPLAY DEVICE COMPRISING A TRANSPARENT REINFORCEMENT PLATE DISPOSED BETWEEN A FIRST POLARIZER AND A BACKLIGHT UNIT

(71) Applicant: Panasonic Liquid Crystal Display Co., Ltd., Hyogo (JP)

(72) Inventors: Tomoharu Notoshi, Hyogo (JP); Ryosuke Yabuki, Hyogo (JP)

(73) Assignee: PANASONIC LIQUID CRYSTAL DISPLAY CO., LTD., Hyogo (JP)

( * ) Notice: Subject to any disclaimer, the term of this patent is extended or adjusted under 35 U.S.C. 154(b) by 10 days.

(21) Appl. No.: 15/695,711

(22) Filed: Sep. 5, 2017

(65) Prior Publication Data

US 2018/0088394 A1 Mar. 29, 2018

(30) Foreign Application Priority Data

Sep. 29, 2016 (JP) ................... 2016-192085

(51) Int. Cl.
*G02F 1/1335* (2006.01)
*G02F 1/1333* (2006.01)

(52) U.S. Cl.
CPC .. *G02F 1/133528* (2013.01); *G02F 1/133308* (2013.01); *G02F 2001/133317* (2013.01); *G02F 2201/54* (2013.01)

(58) Field of Classification Search
CPC ............... G02F 2001/133317; G02F 2201/54
See application file for complete search history.

(56) References Cited

U.S. PATENT DOCUMENTS

| 5,432,624 | A | * | 7/1995 | Black | G02F 1/133621 349/106 |
|---|---|---|---|---|---|
| 6,327,006 | B1 | * | 12/2001 | Sato | G02F 1/136209 349/43 |
| 6,414,781 | B1 | | 7/2002 | Saitoh | |
| 6,437,846 | B1 | * | 8/2002 | Ono | G02F 1/133305 349/113 |
| 2002/0131141 | A1 | | 9/2002 | Saitoh | |
| 2004/0179165 | A1 | * | 9/2004 | Kinoshita | G02F 1/133305 349/158 |

(Continued)

FOREIGN PATENT DOCUMENTS

| JP | 11-024024 | 1/1999 |
|---|---|---|
| JP | 2000-180819 | 6/2000 |

(Continued)

*Primary Examiner* — Paul C Lee
(74) *Attorney, Agent, or Firm* — Hamre, Schumann, Mueller & Larson, P.C.

(57) ABSTRACT

A liquid crystal display device is provided. The liquid crystal display device includes: a liquid crystal cell including a liquid crystal layer interposed between a pair of transparent substrates; a backlight unit behind the liquid crystal cell; a polarizer on a surface of the liquid crystal cell, the surface opposing the backlight unit; a transparent reinforcement plate that is between the liquid crystal cell and the backlight unit and supports the polarizer; and an intermediate frame, which is a middle frame, including a protrusion protruding toward a space between the backlight unit and the transparent reinforcement plate. The transparent reinforcement plate rests on the protrusion of the intermediate frame.

20 Claims, 2 Drawing Sheets

(56) References Cited

U.S. PATENT DOCUMENTS

| | | | |
|---|---|---|---|
| 2010/0014034 A1 | 1/2010 | Matsuhira | |
| 2013/0107143 A1* | 5/2013 | Dighde | G02F 1/133308 349/1 |
| 2013/0155351 A1* | 6/2013 | Garelli | G02B 6/001 349/64 |
| 2014/0078444 A1* | 3/2014 | Tsuchida | G02F 1/133528 349/58 |
| 2014/0285747 A1* | 9/2014 | Jun | G02F 1/133308 349/58 |

FOREIGN PATENT DOCUMENTS

| | | |
|---|---|---|
| JP | 2000-347168 | 12/2000 |
| JP | 2012-093530 | 5/2012 |
| WO | 2008/093704 | 8/2008 |

\* cited by examiner

LIQUID CRYSTAL DISPLAY DEVICE COMPRISING A TRANSPARENT REINFORCEMENT PLATE DISPOSED BETWEEN A FIRST POLARIZER AND A BACKLIGHT UNIT

CROSS REFERENCE TO RELATED APPLICATION

The present application is based on and claims priority of Japanese Patent Application No. 2016-192085 filed on Sep. 29, 2016. The entire disclosure of the above-identified application, including the specification, drawings and claims is incorporated herein by reference in its entirety.

FIELD

The present disclosure relates to a liquid crystal display device.

BACKGROUND

Liquid crystal display devices are used as, for example, displays in, for example, televisions and monitors due to their capability to display images with low power consumption.

Such a liquid crystal display device includes, for example, a liquid crystal cell including a liquid crystal layer interposed between a pair of transparent substrates, a backlight unit disposed behind the liquid crystal cell, and a frame that holds the liquid crystal cell and the backlight unit (for example, see Japanese Unexamined Patent Application Publication No. 2000-180819).

SUMMARY

However, among conventional liquid crystal display devices, there is a problem that the liquid crystal cell warps, leading to a reduction in image quality.

The present disclosure was conceived to overcome such a problem and has an object to provide a liquid crystal display device capable of inhibiting reduction in image quality by inhibiting the liquid crystal cell from warping.

In order to achieve the above object, in one aspect, a liquid crystal display device according to the present disclosure includes: a liquid crystal cell; a backlight unit behind the liquid crystal cell; a polarizer on a surface of the liquid crystal cell, the surface opposing the backlight unit; a transparent reinforcement plate that is between the liquid crystal cell and the backlight unit and supports the polarizer; and a middle frame including a protrusion protruding toward a space between the backlight unit and the transparent reinforcement plate. The transparent reinforcement plate rests on the protrusion.

Since the liquid crystal cell can be inhibited from warping, reduction in image quality due to warping of the liquid crystal cell can be inhibited.

BRIEF DESCRIPTION OF DRAWINGS

These and other objects, advantages and features of the invention will become apparent from the following description thereof taken in conjunction with the accompanying drawings that illustrate a specific embodiment of the present invention.

DESCRIPTION OF EMBODIMENT

The following describes an exemplary embodiment of the present disclosure. The embodiment described below is merely one specific example of the present disclosure. The numerical values, shapes, materials, elements, and arrangement and connection of the elements, etc. indicated in the following embodiment are given merely by way of illustration and are not intended to limit the present disclosure. Therefore, among elements in the following embodiment, those not recited in any one of the independent claims defining the broadest inventive concept of the present disclosure are described as optional elements.

Note that the figures are schematic illustrations and are not necessarily precise depictions. Accordingly, the figures are not necessarily to scale. Moreover, in the figures, elements that are essentially the same share like reference signs. Accordingly, duplicate description is omitted or simplified.

Embodiment

Figure 1:
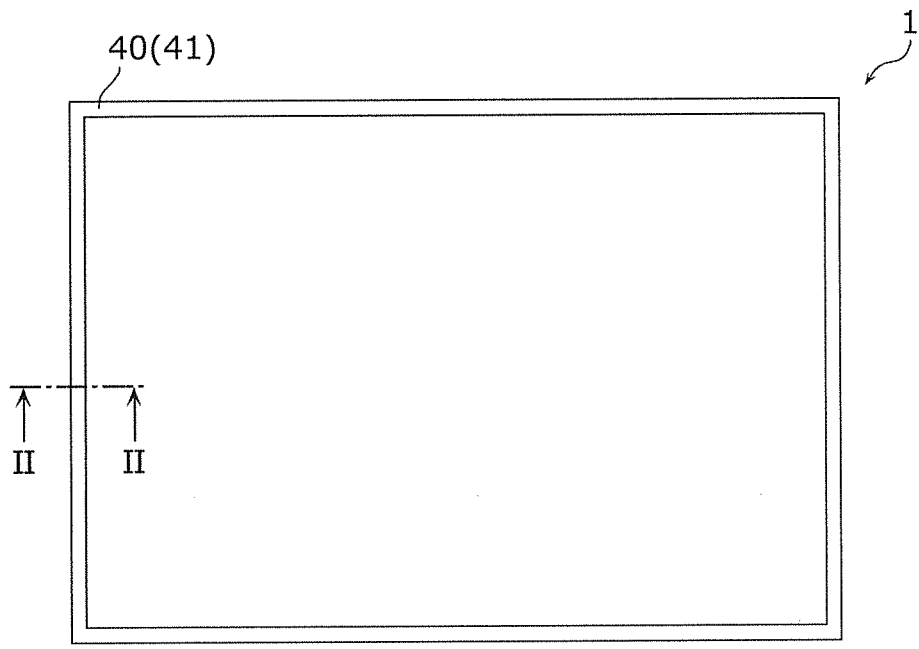
FIG. 1 is a plan view schematically illustrating a liquid crystal display device according to an embodiment.
Figure 2:
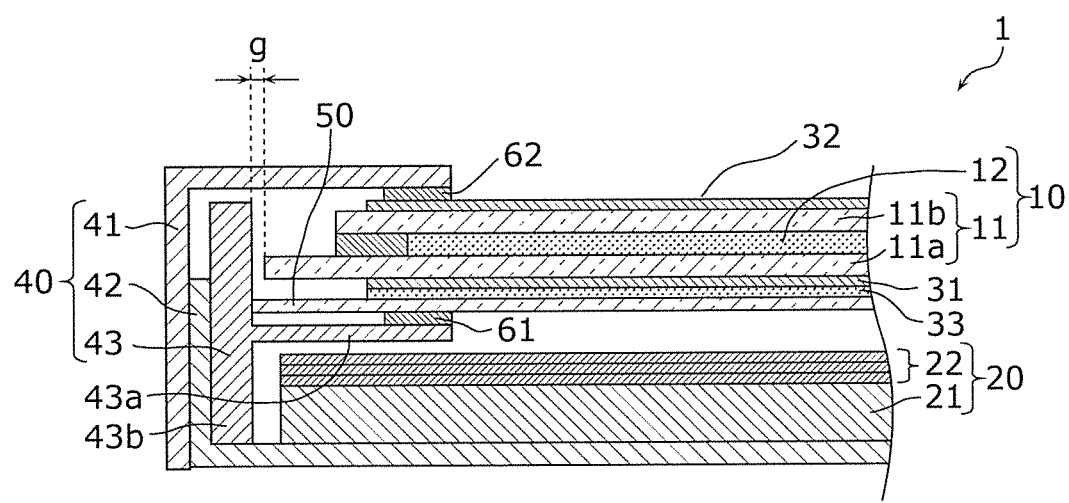
FIG. 2 is a cross sectional view of the liquid crystal display device according to the embodiment, taken at line II-II in FIG. 1.

The configuration of the liquid crystal display device 1 according to the embodiment will be described with reference to FIG. 1 and FIG. 2. FIG. 1 is a plan view schematically illustrating the liquid crystal display device 1 according to the embodiment. FIG. 2 is a cross sectional view of the liquid crystal display device 1 according to the embodiment, taken at line II-II in FIG. 1.

As illustrated in FIG. 1 and FIG. 2, the liquid crystal display device 1 according to this embodiment includes a liquid crystal cell 10, a backlight unit 20 disposed behind the liquid crystal cell 10, a first polarizer 31 and a second polarizer 32 respectively disposed on both surfaces of the liquid crystal cell 10, a frame 40 that holds the liquid crystal cell 10 and the backlight unit 20, and a transparent reinforcement plate 50.

The liquid crystal cell 10 is a liquid crystal panel that displays an image on the display surface, which is the front surface. For example, the liquid crystal cell 10 includes a pair of transparent substrates 11 and a liquid crystal layer 12 disposed between the pair of transparent substrates 11. A driver substrate on which a driver integrated circuit (IC) is formed is connected to the liquid crystal cell 10 via a flexible substrate such as a flexible printed circuit (FPC). In this embodiment, the liquid crystal cell 10 is, but not limited to, being driven using an in-plane switching (IPS) driving method; a vertical alignment (VA) or twisted nematic (TN) driving method may be used.

The pair of transparent substrates 11 are, for example, rectangular glass substrates disposed so as to oppose one another. The pair of transparent substrates 11 include a thin film transistor (TFT) substrate 11a (TFT glass) having, for example, electric lines formed thereon, and a color filter (CF) substrate 11b (CF glass) including red (R), green (G), and blue (B) color filters. In this embodiment, the outline of the TFT substrate 11a is larger than the outline of the CF substrate 11b.

The liquid crystal layer 12 is sealed between the pair of transparent substrates 11. The liquid crystal material used for the liquid crystal layer 12 may be selected according to the method used to drive the liquid crystal cell 10.

The backlight unit 20 emits light toward the liquid crystal cell 10. The backlight unit 20 is a surface light source that emits uniform scattered light (diffused light).

In this embodiment, the backlight unit 20 includes a backlight 21 and an optical sheet 22.

The backlight 21 is, for example, a light emitting diode (LED) backlight that uses LEDs as a light source. White LED elements that emit white light can be used as the LEDs. In such cases, the white LED elements may include, for example, a blue LED chip and a yellow phosphor.

In this embodiment, the backlight 21 is a direct-lit LED backlight in which LEDs are arranged in a matrix on a substrate. Note that the backlight 21 may be an edge-lit backlight including a light guide plate, a light source disposed at an edge surface of the light guide plate, and a reflector disposed on the rear surface of the light guide plate.

The optical sheet 22 is disposed on the front surface of the backlight 21. The optical sheet 22 may comprise one sheet or two or more sheets. For example, the optical sheet 22 includes a diffuser (diffusion sheet) for diffusing light from the backlight 21.

The first polarizer 31 is disposed on the liquid crystal cell 10, on the surface opposing the backlight unit 20 (i.e., on the rear surface of the liquid crystal cell 10). In other words, the first polarizer 31 is a lower polarizer disposed on the rear surface (lower surface) of the liquid crystal cell 10. More specifically, the first polarizer 31 is bonded to the outer surface of the TFT substrate 11a.

The second polarizer 32 is disposed on the liquid crystal cell 10, on the surface opposite the surface opposing the backlight unit 20 (i.e., on the front surface of the liquid crystal cell 10). In other words, the second polarizer 32 is an upper polarizer disposed on the front surface (upper surface) of the liquid crystal cell 10. More specifically, the second polarizer 32 is bonded to the outer surface of the CF substrate 11b.

The first polarizer 31 and the second polarizer 32 are disposed such that their respective polarizing directions are orthogonal to one another. In other words, the first polarizer 31 and the second polarizer 32 are disposed in a crossed nicols configuration. The first polarizer 31 and the second polarizer 32 are, for example, polarizing film sheets made of a resin material. Moreover, a phase retarder (phase retarding film) may be bonded to each of the first polarizer 31 and the second polarizer 32.

The frame 40 includes an upper frame 41 (front frame) a lower frame 42 (rear frame), and an intermediate frame 43 (middle frame).

As illustrated in FIG. 1, the upper frame 41 has a frame-like rectangular shape in a plan view, and as illustrated in FIG. 2, is an angled component having an L-shaped cross section. The upper frame 41 includes a side wall disposed on a lateral side of the liquid crystal cell 10 and the backlight unit 20, and a bezel that covers the outer periphery of the liquid crystal cell 10. The upper frame 41 is an outer component that forms the outer contour of the frame 40, and may be made of a rigid material, such as a copper or aluminum plate.

The lower frame 42 includes a side wall that is disposed on a lateral side of the liquid crystal cell 10 and backlight unit 20 and inward relative to the side wall of the upper frame 41, and a rear surface section that covers the lower surface of the backlight unit 20. The lower frame 42 is an outer component that forms the outer contour of the frame 40, and like the upper frame 41, may be made of a rigid material, such as a copper or aluminum plate.

The intermediate frame 43 has a rectangular frame-like plan view shape, and has a T-shaped cross section. A molded frame formed by molding composite resin may be used as the intermediate frame 43, but the material of the intermediate frame 43 is not limited to a resin material; the intermediate frame 83 may be made of a metal material. The intermediate frame 43 may have light blocking properties, such as by being black in color, but is not limited to this example.

The intermediate frame 43 includes a protrusion 43a that protrudes toward a space between the backlight unit 20 and the transparent reinforcement plate 50, and a side wall 43b disposed on a lateral side of the liquid crystal cell 10 and the backlight unit 20.

The protrusion 43a protrudes from the side wall 43b, toward a space between the liquid crystal cell 10 and the transparent reinforcement plate 50, to a position corresponding to the outer periphery of the liquid crystal cell 10.

The side wall 43b is disposed between a side wall of the lower frame 42 (or upper frame 41) and the transparent reinforcement plate 50. Moreover, the side wall 43b may also function as a spacer that regulates the distance between the upper frame 41 and the lower frame 42. The bottom end of the side wall 43b may or may not contact the inner surface of the rear surface section of the lower frame 42. Moreover, the top end of the side wall 43b may or may not contact the inner surface of the bezel of the upper frame 41.

Moreover, in this embodiment, the transparent reinforcement plate 50 contacts the inner surface of the side wall 43b, but the side wall 43b and the transparent reinforcement plate 50 need not be in contact.

The transparent reinforcement plate 50 is a support component that supports the first polarizer 31, and is disposed between the liquid crystal cell 10 and the backlight unit 20. In this embodiment, the transparent reinforcement plate 50 is disposed between the first polarizer 31 on the liquid crystal cell 10 and the backlight unit 20.

The transparent reinforcement plate 50 is bonded to the first polarizer 31 on the liquid crystal cell 10. Accordingly, the transparent reinforcement plate 50 supports the liquid crystal cell 10 in addition to the first polarizer 31. In this embodiment, the transparent reinforcement plate 50 is bonded to the first polarizer 31 via an adhesive layer 33, which fixes the transparent reinforcement plate 50 and the liquid crystal cell 10 together. For example, a transparent adhesive, such as an optically clear adhesive (OCA) can be used as the adhesive layer 33.

The transparent reinforcement plate 50 rests on the protrusion 43a of the intermediate frame 43. More specifically, the transparent reinforcement plate 50 rests on the protrusion 43a in a state in which the liquid crystal cell 10 is bonded to the transparent reinforcement plate 50. In this case, the transparent reinforcement plate 50 is not fixed to the protrusion 43a (the intermediate frame 43), but rests on the protrusion 43a so as to be movable relative to the frame 40. More specifically, the transparent reinforcement plate 50 rests on the protrusion 43a such that it can freely slide horizontally relative to the surface of the liquid crystal cell 10 (i.e., parallel to the surface of the liquid crystal cell 10) on the frame 40. In other words, the liquid crystal cell 10 is held by the frame 40 so as to be capable of sliding along with the transparent reinforcement plate 50, in directions parallel to its surface.

In this embodiment, the transparent reinforcement plate 50 rests on the protrusion 43a via a non-adhesive cushion 61. In other words, the transparent reinforcement plate 50 is disposed on the non-adhesive cushion 61. The non-adhesive cushion 61 is a shock absorbing component having a closed-cell structure, such as polyethylene foam, and the surface of the non-adhesive cushion 61 is smooth and dry to the touch. The non-adhesive cushion 61 is fixed to the protrusion 43a of the intermediate frame 43 by, for example, an adhesive.

Note that a cushion 62 may be disposed between the upper frame 41 and the liquid crystal cell 10. More specifically, the cushion 62 may be inserted so as to be held between the upper frame 41 and the second polarizer 32. This makes it possible to eliminate a gap between the upper frame 41 and the liquid crystal cell 10 (the second polarizer 32), thereby making it possible to inhibit infiltration of, for example, dust and/or bugs.

In a plan view, the outer contour of the transparent reinforcement plate 50 is external to the outer contour of the liquid crystal cell 10. In other words, the outline of the transparent reinforcement plate 50 is larger than the outline of the liquid crystal cell 10. In this embodiment, since the outline of the TFT substrate 11a is larger than the outline of the CF substrate 11b, the outline of the transparent reinforcement plate 50 is designed to be larger than the outline of the TFT substrate 11a.

In this way, by designing the outline of the transparent reinforcement plate 50 to be larger than the outline of the liquid crystal cell 10, as illustrated in FIG. 2, a gap g between the inner surface of the side wall 43b of the intermediate frame 43 and the liquid crystal cell 10 (the TFT substrate 11a) can be provided. The gap g is equivalent to the difference in size between the transparent reinforcement plate 50 and the liquid crystal cell 10 (the TFT substrate 11a). This prevents the liquid crystal cell 10 (the TFT substrate 11a) from contacting the intermediate frame 43.

For example, plate glass that is transparent relative to visible light can be used as the transparent reinforcement plate 50 configured as described above. More specifically, tempered glass that has excellent mechanical strength can be used as the transparent reinforcement plate 50. In this case, the glass used as the transparent reinforcement plate 50 may transmit infrared light in addition to visible light.

Moreover, a metal layer made of a metal material that has a high thermal conductivity, such as copper, may be formed on the transparent reinforcement plate 50. In this case, a patterned film having holes arranged in a mesh or grid pattern may be used as the metal layer, or a metal film formed on almost the entire surface of the transparent reinforcement plate 50 may be used as the metal layer so long as the film is thin enough to transmit light. Note that if the metal layer is to be formed on the transparent reinforcement plate 50, the metal layer is desirably formed on the surface of the transparent reinforcement plate 50 that opposes the backlight unit 20.

The liquid crystal display device 1 configured in this manner is HDR-compatible, which is compatible with, for example, 4K/8K, and as described above, a high-luminosity direct-lit LED backlight capable of local dimming is used as the backlight 21. This makes it possible to display a high contrast, high-quality color image.

Figure 3:
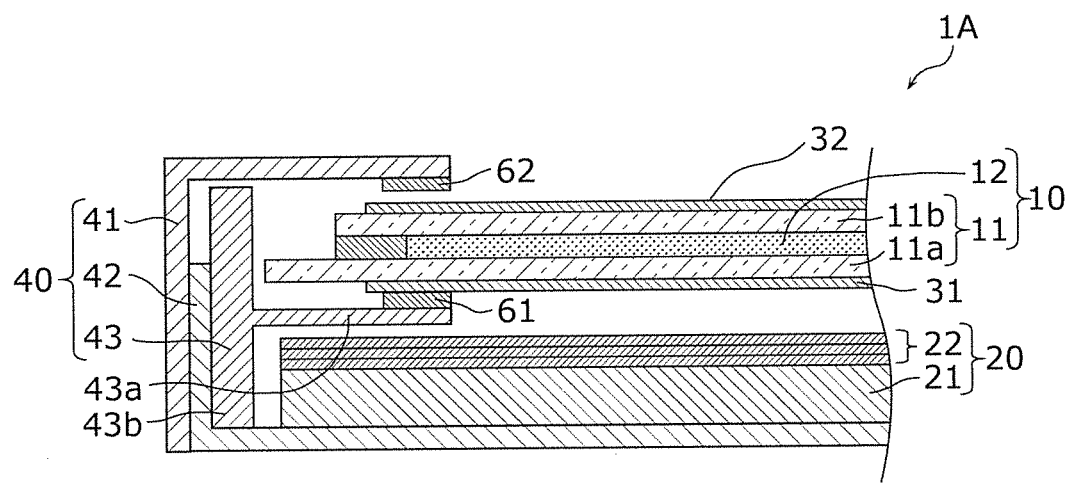
FIG. 3 is a partial cross sectional view of a liquid crystal display device according to comparative example 1.
Figure 4:
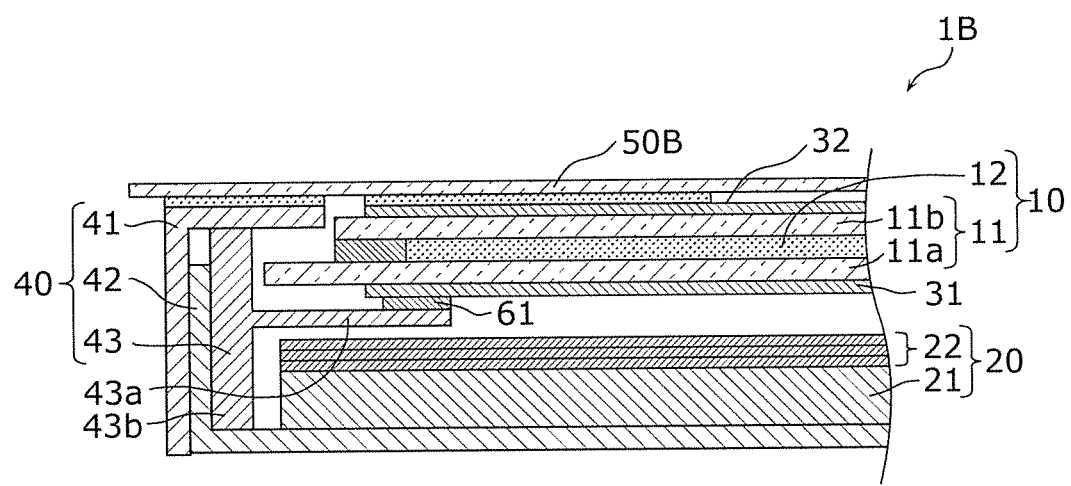
FIG. 4 is a partial cross sectional view of a liquid crystal display device according to comparative example 2.

Next, the advantageous effects of the liquid crystal display device 1 according to this embodiment as well as how the techniques of the present disclosure were arrived at will be described with reference to FIG. 3 and FIG. 4, while also referring back to FIG. 2. FIG. 3 is a partial cross sectional view of a liquid crystal display device 1A according to comparative example 1. FIG. 4 is a partial cross sectional view of a liquid crystal display device 1B according to comparative example 2.

In liquid crystal display devices, it is conceivable for the liquid crystal cell to be held down using a structural component such as a frame in order to fix the liquid crystal cell in place. However, physically holding down the liquid crystal cell using a structural component reduces the quality of images displayed on the liquid crystal cell. For example, holding the edge portion of the liquid crystal cell down by the upper frame generates local stress in the liquid crystal cell, which reduces image quality.

Accordingly, as illustrated in FIG. 3, in the liquid crystal display device 1A according to comparative example 1, the liquid crystal cell 10 is held by the frame 40 in a state in which a gap is present (i.e., in a state in which there is clearance) between the upper frame 41 and the liquid crystal cell 10. This makes it possible to inhibit a reduction in image quality caused by the liquid crystal cell 10 being held down by the upper frame 41.

However, with the configuration of the liquid crystal display device 1A according to the comparative example 1 illustrated in FIG. 3, expansion and contraction of the first polarizer 31 and the second polarizer 32 cause the liquid crystal cell 10 to warp, resulting in the problem of a reduction in image quality.

More specifically, the first polarizer 31 and the second polarizer 32 are respectively disposed on both surfaces of the liquid crystal cell 10, and expansion of the first polarizer 31 and the second polarizer 32 due to heat or absorbing moisture causes the liquid crystal cell 10 to warp.

For example, the first polarizer 31 and the second polarizer 32 are affected by heat as a result of light from the backlight unit 20 being absorbed as it passes through the first polarizer 31 and the second polarizer 32 and converted into heat. The first polarizer 31 and the second polarizer 32 are also affected by heat as a result of light from the backlight unit 20 being absorbed as it passes through the liquid crystal cell 10 and converted into heat, whereby the heat produced in the liquid crystal cell 10 transfers to the first polarizer 31 and the second polarizer 32. For example, approximately 95% of the light from the backlight unit 20 is absorbed by the liquid crystal cell 10. When the first polarizer 31 and the second polarizer 32 are affected by heat in this manner, the first polarizer 31 and the second polarizer 32 thermally expand laterally. In such cases, when the amounts of thermal expansion (amounts of increase in size) of the first polarizer 31 and the second polarizer 32 are different, the liquid crystal cell 10 sandwiched between the first polarizer 31 and the second polarizer 32 warps. Moreover, the liquid crystal cell 10 warps not only when the first polarizer 31 and the second polarizer 32 expand, but may also warp when the first polarizer 31 and the second polarizer 32 contract when, for example, the temperatures of the first polarizer 31 and the second polarizer 32 decrease.

The liquid crystal cell 10 warping in this manner reduces the image quality of the liquid crystal display device 1A. For example, when the liquid crystal cell 10 is driven using an IPS driving method, regions displayed in black appear uneven.

In light of this, one conceivable configuration is to include a transparent reinforcement plate 50B that covers the entire front surface of the liquid crystal cell 10, as illustrated in the liquid crystal display device 1B according to comparative example 2 illustrated in FIG. 4. For example, the transparent reinforcement plate 50B, which is a single pane of plate glass, is disposed to cover the second polarizer 32 on the front surface of the liquid crystal cell 10 and the front surface of the bezel of the upper frame 41, and is bonded to the second polarizer 32 and the upper frame 41 using a transparent adhesive.

However, with the configuration of the liquid crystal display device 1B according to comparative example 2 illustrated in FIG. 4, the liquid crystal cell 10 is fixed to the upper frame 41 via the transparent reinforcement plate 50B, whereby the liquid crystal cell 10 is held down by the transparent reinforcement plate 50B, thereby restricting movement of the liquid crystal cell 10. Accordingly, there is concern that this will generate local stress in the liquid crystal cell 10, resulting in a localized reduction of image quality. Moreover, when the liquid crystal cell 10 is fixed in place by the frame 40 (the upper frame 41), if the frame 40 deforms due to, for example, being screwed down or compressed, this may generate stress in the liquid crystal cell 10 and reduce image quality.

Moreover, the first polarizer 31, which is closer to the backlight unit 20 than the second polarizer 32, is more likely to have a higher amount of thermal expansion than the second polarizer 32. This results in the liquid crystal cell 10 tending to warp by bowing convexly toward the backlight unit 20, but the transparent reinforcement plate 50B inhibits the liquid crystal cell 10 from warping. As a result, internal stress may generate in the substrates 11a and 11b in the liquid crystal cell 10 whereby double refraction may occur in the surfaces of the substrates 11a and 11b, possibly causing a reduction in image quality.

When the backlight unit 20 is capable of local dimming in particular, there is a chance that light from the backlight unit 20 may not only illuminate the liquid crystal cell 10 and the first polarizer 31 (the second polarizer 32) in entirety, but also locally. Accordingly, in addition to cases in which the first polarizer 31 and the second polarizer 32 expand as a whole, causing the liquid crystal cell 10 to tend to warp as a whole, there are cases in which the first polarizer 31 and the second polarizer 32 expand locally, causing the liquid crystal cell 10 to tend to warp locally. In such cases, there is concern that this will produce a localized reduction in image quality. Moreover, when the backlight unit 20 is a high-luminosity, HDR compatible backlight unit, the localized warping of the liquid crystal cell 10 is obvious.

Moreover, by bonding the transparent reinforcement plate 50B to the front surface side of the liquid crystal cell 10, as is the case in the liquid crystal display device 1B according to comparative example 2 illustrated in FIG. 4, when the liquid crystal display device 1B is used as a sensor panel, there is a problem that stray light more easily enters the liquid crystal cell 10.

In order to address this, the liquid crystal display device 1 according to this embodiment includes: the liquid crystal cell 10 including a pair of transparent substrates 11 and a liquid crystal layer 12 disposed between the pair of transparent substrates 11; the backlight unit 20 behind the liquid crystal cell 10; the first polarizer 31 on a surface of the liquid crystal cell 10, the surface opposing the backlight unit 20; the transparent reinforcement plate 50 that is between the liquid crystal cell 10 and the backlight unit 20 and supports the first polarizer 31; and the intermediate frame 43, which is the middle frame, including the protrusion 43a protruding toward a space between the backlight unit 20 and the transparent reinforcement plate 50. The transparent reinforcement plate 50 rests on the protrusion 43a of the intermediate frame 43.

Accordingly, in the liquid crystal display device 1 according to this embodiment, the first polarizer 31 on the rear surface side of the liquid crystal cell 10 is supported by the transparent reinforcement plate 50 and the transparent reinforcement plate 50 rests on the protrusion 43a of the intermediate frame 43.

This makes it possible to inhibit the liquid crystal cell 10 from warping due to expansion and contraction from heat and moisture absorption by the first polarizer 31 on the rear surface side of the liquid crystal cell 10, by bracing the liquid crystal cell 10 with the transparent reinforcement plate 50. Accordingly, since the liquid crystal cell 10 can be inhibited from warping due to expansion amount differences between the first polarizer 31 and the second polarizer 32, reduction in image quality can also be inhibited. In particular, localized reduction in image quality can be inhibited.

Further, since the transparent reinforcement plate 50 rests on the protrusion 43a of the intermediate frame 43, the transparent reinforcement plate 50 is held by the frame 40 in a state in which it is not fixed in the frame 40. In other words, the transparent reinforcement plate 50 is movable relative to the frame 40. As a result, the liquid crystal cell 10 held by the transparent reinforcement plate 50 is also held by the frame 40 without being fixed to the frame 40. This makes it possible to inhibit reduction in image quality since generation of stress in the liquid crystal cell 10 can be inhibited even if the frame 40 deforms due to, for example, being screwed down or compressed.

Further, since the transparent reinforcement plate 50 is disposed behind the liquid crystal cell 10 and not in front of the liquid crystal cell 10, even when the liquid crystal display device 1 is used as a sensor panel, stray light can be inhibited from entering.

Moreover, in the liquid crystal display device 1 according to this embodiment, the outer contour of the transparent reinforcement plate 50 is external to the outer contour of the liquid crystal cell 10.

With this configuration, reduction in image quality can be inhibited even further, and the edge portions of the liquid crystal cell 10 can be prevented from being damaged. This will be discussed in further detail below.

When the liquid crystal display device 1 stands vertically such that the front surface of the liquid crystal cell 10 is facing horizontally, the intermediate frame 43 is located below the liquid crystal cell 10 In these cases, the liquid crystal cell 10 and the transparent reinforcement plate 50 move downward due to gravity, but when the outer contour of the transparent reinforcement plate 50 is further inward than the outer contour of the liquid crystal cell 10 (for example, when the outline of the transparent reinforcement plate 50 is smaller than the outline of the liquid crystal cell 10), the liquid crystal cell 10 protrudes out farther than the transparent reinforcement plate 50, whereby the edge of the liquid crystal cell 10 rather than the transparent reinforcement plate 50 comes into contact with the intermediate frame 43. This places stress on the edge portion of the liquid crystal cell 10, and may deform the liquid crystal cell 10 and thus reduce image quality, or damage the end portion of the liquid crystal cell 10.

In contrast, when the outer contour of the transparent reinforcement plate 50 is external to the outer contour of the liquid crystal cell 10, when the liquid crystal display device 1 stands vertically, even if the liquid crystal cell 10 and the transparent reinforcement plate 50 move downward due to gravity, the edge portion of the transparent reinforcement plate 50 protrudes farther out than the liquid crystal cell 10, whereby the edge of the transparent reinforcement plate 50 instead of the liquid crystal cell 10 comes into contact with the intermediate frame 43. Since this makes it possible to avoid stress from generating in the edge portions of the liquid crystal cell 10, reduction in image quality can be inhibited even further, and the edge portions of the liquid crystal cell 10 can be prevented from being damaged.

Moreover, the liquid crystal display device 1 according to this embodiment further includes the non-adhesive cushion 61 that is fixed to the protrusion 43a of the intermediate frame 43, and the transparent reinforcement plate 50 rests on the protrusion 43a via the non-adhesive cushion 61.

This makes it possible to avoid defects due to the transparent reinforcement plate 50 and the intermediate frame 43 (the protrusion 43a) coming into direct contact, and makes it possible to easily ensure a state in which the transparent reinforcement plate 50 is movable relative to the frame 40. As a result, reduction in image quality due to deformation of the frame 40 can be inhibited and the transparent reinforcement plate 50 can be protected.

Moreover, in the liquid crystal display device 1 according to this embodiment, a metal layer may be formed on the transparent reinforcement plate 50.

This makes it possible to further inhibit the liquid crystal cell 10 from warping due to thermal expansion of the first polarizer 31, since heat can be efficiently dissipated from the first polarizer 31. Accordingly, reduction in image quality can be further inhibited. Moreover, by dissipating heat from the first polarizer 31, deterioration of the first polarizer 31 due to heat can be inhibited.

Moreover, in the liquid crystal display device 1 according to this embodiment, the transparent reinforcement plate 50 may be plate glass.

This makes it possible to realize a structure capable of easily inhibiting the liquid crystal cell 10 from warping.

Moreover, in the liquid crystal display device 1 according to this embodiment, the transparent reinforcement plate 50 (plate glass) may transmit infrared light in addition to visible light.

The first polarizer 31 is affected by heat when the transparent reinforcement plate 50 absorbs infrared light, the absorbed infrared light is converted into heat, and the heat is transferred to the first polarizer 31. However, when infrared light is transmitted by the transparent reinforcement plate 50, the first polarizer 31 can be inhibited from being affected by heat resulting from the transparent reinforcement plate 50 absorbing light. This makes it possible to further inhibit the liquid crystal cell 10 from warping due to thermal expansion of the first polarizer 31.

Moreover, in the liquid crystal display device 1 according to this embodiment, the transparent reinforcement plate 50 is bonded to the first polarizer 31 via the adhesive layer 33.

With this, the transparent reinforcement plate 50 and the liquid crystal cell 10 can easily be bonded together. Moreover, by bonding the transparent reinforcement plate 50 and the liquid crystal cell 10 together, the transparent reinforcement plate 50 and the liquid crystal cell 10 can move as a single unit relative to the frame 40. With this, the transparent reinforcement plate 50 and the liquid crystal cell 10 can be held by the frame 40 as a single unit, and reduction in image quality due to deformation of the frame 40 can be inhibited.

Variation

While the liquid crystal display device according to the present disclosure has been described according to an exemplary embodiment, the present disclosure is not limited to this embodiment.

For example, in the above embodiment, white light is produced using phosphor as a wavelength converter in the backlight unit 20, but this example is not limiting; for example, quantum dots may be used as a wavelength converter. In these cases, white LED elements employing quantum dots may be used as the light source for the backlight 21, but an optical film (quantum dot film) containing quantum dots such as a quantum dot enhancement film (QDEF) may be used as the optical sheet 22, and blue LED elements that emit blue light that excites the quantum dots may be used as the light source for the backlight 21. Note that two types of quantum dots may be used to convert the blue light into green light and red light. By using quantum dots as the wavelength converter, compared to when phosphor is used as the wavelength converter, it is possible to achieve a liquid crystal display device having more desirable color rendering properties.

Moreover, in the above embodiment, glass substrates are used as the transparent substrates 11 included in the liquid crystal cell 10, but this example is not limiting; for example, transparent resin substrates may be used as the transparent substrates 11.

Those skilled in the art will readily appreciate that many modifications are possible in the above exemplary embodiment and variations without materially departing from the novel teachings and advantages of the present disclosure. Accordingly, all such modifications are intended to be included within the scope of the present disclosure.

The invention claimed is:

1. A liquid crystal display device comprising:
    a liquid crystal cell comprising a first transparent substrate, a second transparent substrate, and a liquid crystal layer disposed between the first transparent substrate and the second transparent substrate;
    a backlight unit behind the liquid crystal cell;
    a first polarizer disposed between the liquid crystal cell and the backlight unit and attached to the first transparent substrate;
    a transparent reinforcement plate disposed between the first polarizer and the backlight unit and attached to the first polarizer;
    a middle frame including:
        a protrusion protruding toward a space between the backlight unit and the transparent reinforcement plate, and
        a side wall disposed on a lateral side of the liquid crystal cell and the first polarizer,
        wherein the transparent reinforcement plate rests on the protrusion, and in a plan view, an outer contour of the transparent reinforcement plate is external to each of an outer contour of the first transparent substrate, an outer contour of the second transparent substrate, and an outer contour of the first polarizer,
        a first gap is disposed in a space at least partially surrounded by the first transparent substrate, the side wall, the transparent reinforcement plate, and the first polarizer,
        a second gap is provided between the side wall and the liquid crystal cell, and
        the first gap is wider in a lateral direction than the second gap.

2. The liquid crystal display device according to claim 1, further comprising:
    a non-adhesive cushion fixed to the protrusion,
    wherein the transparent reinforcement plate rests on the protrusion via the non-adhesive cushion.

3. The liquid crystal display device according to claim 1, wherein a metal layer is formed on a surface of the transparent reinforcement plate that faces the backlight unit.

4. The liquid crystal display device according to claim 1, wherein the transparent reinforcement plate is plate glass.

5. The liquid crystal display device according to claim 4, wherein the plate glass transmits visible light and infrared light.

6. The liquid crystal display device according to claim 1, wherein the transparent reinforcement plate is bonded to the first polarizer via an adhesive layer.

7. The liquid crystal display device according to claim 1, wherein the liquid crystal cell is driven using an in-plane switching driving method.

8. The liquid crystal display device according to claim 1, further comprising:
a second polarizer attached to the second transparent substrate,
wherein in a plan view, the outer contour of the transparent reinforcement plate is external to an outer contour of the second polarizer.

9. The liquid crystal display device according to claim 1, wherein the outer contour of the first transparent substrate is external to the outer contour of the first polarizer.

10. The liquid crystal display device according to claim 2, wherein
an air gap is provided in a space at least partially surrounded by the non-adhesive cushion, the side wall, the transparent reinforcement plate, and the protrusion.

11. The liquid crystal display device according to claim 1, wherein a third gap is provided between the side wall and the transparent reinforcement plate.

12. The liquid crystal display device according to claim 11, wherein the first gap is wider in a lateral direction than the third gap.

13. A liquid crystal display device comprising:
a liquid crystal cell comprising a first transparent substrate, a second transparent substrate, and a liquid crystal layer disposed between the first transparent substrate and the second transparent substrate;
a backlight unit behind the liquid crystal cell;
a first polarizer disposed between the liquid crystal cell and the backlight unit and attached to the first transparent substrate;
a transparent reinforcement plate disposed between the first polarizer and the backlight unit and attached to the first polarizer;
a middle frame including a protrusion protruding toward a space between the backlight unit and the transparent reinforcement plate, and a side wall disposed on a lateral side of the liquid crystal cell and the first polarizer,
wherein the transparent reinforcement plate rests on the protrusion, and in a plan view, an outer contour of the transparent reinforcement plate is external to each of an outer contour of the first transparent substrate, an outer contour of the second transparent substrate, and an outer contour of the first polarizer;
a first gap disposed in a space at least partially surrounded by the first transparent substrate, the side wall, the transparent reinforcement plate, and the first polarizer,
a second gap provided between the side wall and the transparent reinforcement plate, and
the first gap is wider in a lateral direction than the second gap.

14. The liquid crystal display device according to claim 13, further comprising:
a non-adhesive cushion fixed to the protrusion,
wherein the transparent reinforcement plate rests on the protrusion via the non-adhesive cushion.

15. The liquid crystal display device according to claim 13, wherein a metal layer is formed on a surface of the transparent reinforcement plate that faces the backlight unit.

16. The liquid crystal display device according to claim 13, wherein
the transparent reinforcement plate is plate glass, and
the plate glass transmits visible light and infrared light.

17. The liquid crystal display device according to claim 13, wherein the transparent reinforcement plate is bonded to the first polarizer via an adhesive layer.

18. The liquid crystal display device according to claim 13, wherein the liquid crystal cell is driven using an in-plane switching driving method.

19. The liquid crystal display device according to claim 13, further comprising:
a second polarizer attached to the second transparent substrate,
wherein in a plan view, the outer contour of the transparent reinforcement plate is external to an outer contour of the second polarizer.

20. The liquid crystal display device according to claim 13, wherein the outer contour of the first transparent substrate is external to the outer contour of the first polarizer.

* * * * *